United States Patent
Trachtman (10) Patent No.: US 10,091,177 B1
(45) Date of Patent: Oct. 2, 2018

(54) CONTROLLING ACCESS TO A COMPUTERIZED RESOURCE OF A MOBILE DEVICE BASED ON WHETHER THE MOBILE DEVICE IS WITHIN A VEHICLE THAT IS CURRENTLY MOVING

(71) Applicant: EMC Corporation, Hopkinton, MA (US)

(72) Inventor: Michael Trachtman, Arlington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 154 days.

(21) Appl. No.: 15/086,514

(22) Filed: Mar. 31, 2016

(51) Int. Cl.
  *H04L 29/00* (2006.01)
  *H04L 29/06* (2006.01)
  *H04L 29/08* (2006.01)

(52) U.S. Cl.
  CPC .............. *H04L 63/08* (2013.01); *H04L 63/10* (2013.01); *H04L 67/12* (2013.01)

(58) Field of Classification Search
  CPC .......... H04L 63/08; H04L 63/10; H04L 67/12
  See application file for complete search history.

(56) References Cited

U.S. PATENT DOCUMENTS

| | | | |
|---|---|---|---|
| 7,183,666 B2 * | 2/2007 | Arakawa | B60R 25/102 307/10.2 |
| 7,187,953 B2 * | 3/2007 | Bauchot | H04M 1/6075 455/441 |
| 9,319,845 B1 * | 4/2016 | Rownin | H04W 4/046 |
| 9,324,121 B2 | 4/2016 | Osann, Jr. | |
| 9,324,149 B2 * | 4/2016 | Wigton | G06K 9/0061 |
| 9,363,734 B2 | 6/2016 | Rajeevalochana | |
| 9,373,257 B2 | 6/2016 | Bonhomme | |
| 9,374,423 B2 | 6/2016 | Crosbie et al. | |
| 2010/0175116 A1 | 7/2010 | Gum | |
| 2011/0009107 A1 * | 1/2011 | Guba | G08G 1/20 455/418 |
| 2013/0169434 A1 | 7/2013 | McCown et al. | |

(Continued)

OTHER PUBLICATIONS

Trachtman, "Varying the Amount of Time That a Mobile Device Must Be Inactive Before the Mobile Device Re-Locks Access to a Computerized Resource", U.S. Appl. No. 15/086,519, filed Mar. 31, 2016.

*Primary Examiner* — Don G Zhao
(74) *Attorney, Agent, or Firm* — BainwoodHuang (57) ABSTRACT

A technique controls access to a computerized resource of a mobile device (e.g., a smart phone, a tablet, etc.). The technique involves, in response to successfully authenticating a user, unlocking access to the computerized resource of the mobile device and starting a timer which is configured to lock access to the computerized resource of the mobile device upon timer expiration. The technique further involves, after the timer is started and while access to the computerized resource of the mobile device is unlocked, receiving a sensor signal from sensor circuitry. The sensor signal indicates whether the mobile device is in a vehicle that is currently moving. The technique further involves, in response to the sensor signal indicating that the mobile device is in a vehicle that is currently moving, restarting the timer which is configured to lock access to the computerized resource of the mobile device upon timer expiration.

24 Claims, 4 Drawing Sheets

(56) References Cited

U.S. PATENT DOCUMENTS

| | | | |
|---|---|---|---|
| 2013/0316737 A1* | 11/2013 | Guba | G08G 1/20 |
| | | | 455/456.4 |
| 2015/0175102 A1* | 6/2015 | Greer | B60R 16/03 |
| | | | 701/36 |
| 2015/0356289 A1 | 12/2015 | Brown et al. | |
| 2016/0006860 A1* | 1/2016 | Neitzel | H04M 1/72577 |
| | | | 455/419 |
| 2016/0267476 A1* | 9/2016 | Beelen | G06Q 20/20 |

* cited by examiner

CONTROLLING ACCESS TO A COMPUTERIZED RESOURCE OF A MOBILE DEVICE BASED ON WHETHER THE MOBILE DEVICE IS WITHIN A VEHICLE THAT IS CURRENTLY MOVING

BACKGROUND

A conventional smart phone requires a user to enter a password successfully (e.g., a correct sequence of numbers) before unlocking the user screen. Once the user enters the password successfully, the user screen of the smart phone unlocks, and the user is able to operate the smart phone (e.g., the user is able to make a cellular call, launch and operate apps, etc.).

After the user screen is unlocked, the smart phone monitors user screen activity and automatically re-locks the user screen if the user screen remains inactive for a predefined period of time (e.g., five minutes, 10 minutes, etc.). Accordingly, if the user leaves the smart phone unattended for that period of time, the smart phone automatically relocks the user screen rather than allow the smart phone to remain in the unlocked state and thus vulnerable to a malicious person.

SUMMARY

Unfortunately, there are deficiencies to the above-described conventional smart phone which automatically re-locks the user screen if the user screen remains inactive for a predefined period of time. For example, the user may want to use the conventional smart phone while driving a vehicle. However, since the conventional smart phone re-locks the user screen after a period of inactivity, the user is burdened by having to correctly re-enter the password while driving after the user screen has re-locked. Moreover, a password which is difficult to enter may promote accident-causing behavior (e.g., may distract the driver from watching the road while driving, etc.).

To address this issue, the user may configure the conventional smart phone with a trivial password such as "1111" that is relatively easy to enter while driving. Although such a trivial password may provide convenience to the user, such a trivial password compromises the security of the conventional smart phone (e.g., the trivial password is easy to guess).

Moreover, some conventional smart phones are configured to impose an extended lockout period or even delete data on the smart phone if a user unsuccessfully attempts to enter the password a certain number of times in a row within a predefined time period (e.g., if a wrong password is entered three times in a row within a two minute span). Such operation is designed to prevent an unauthorized malicious person from using trial-and-error to guess the user's correct password. However, such a feature may also promote accident-causing behavior since the user will focus more attention on correctly entering the password than on driving in order to avoid triggering the lockout period or data deletion.

In contrast to the above-described conventional smart phone which simply re-locks the user screen if the smart phone remains inactive for a predefined period of time, improved techniques are directed to restarting a locking timer of a mobile device (i.e., a timer which locks a computerized resource such as a user screen after a period of inactivity) while the authorized user of the mobile device is driving a vehicle. Such improved techniques enable the user to enter the correct password prior to driving and then enjoy continued access while the user is driving. That is, such restarting of the locking timer while the user is driving prevents re-locking of user access thus alleviating the need for the user to re-enter a password while driving. Accordingly, the mobile device does not promote accident-causing behavior (e.g., distracted driving). Moreover, the user is able to choose longer, more random passwords for the mobile device such as "3781790417" which provide stronger security.

One embodiment is directed to a method of controlling access to a computerized resource of a mobile device (e.g., a smart phone, a tablet, a laptop computer, etc.). The method includes, in response to successfully authenticating a user, unlocking access to the computerized resource of the mobile device and starting a timer which is configured to lock access to the computerized resource of the mobile device upon timer expiration. The method further includes, after the timer is started and while access to the computerized resource of the mobile device is unlocked, receiving a sensor signal from sensor circuitry. The sensor signal indicates whether the mobile device is in a vehicle that is currently moving. The method further includes, in response to the sensor signal indicating that the mobile device is in a vehicle that is currently moving, restarting the timer which is configured to lock access to the computerized resource of the mobile device upon timer expiration. Such restarting of the timer prevents the mobile device from automatically re-locking access to the computerized resource thus avoiding promoting accident-causing user behavior (e.g., requiring the user to enter a password while driving) and enabling the user to choose a form of authentication (e.g., a long, random password) which provides relatively strong security.

In some arrangements, the method further includes continuing to receive the sensor signal from the sensor circuitry and, in response to the sensor signal indicating that the mobile device is in a vehicle that is not currently moving and while continuing to receive the sensor signal, enabling the timer to count toward timer expiration. Accordingly, if the vehicle is not moving for an extended period of time (e.g., if the vehicle is not running or if the vehicle is parked in a parking lot), the mobile device is able to re-lock access to the computerized resource.

Once the mobile device re-locks access to the computerized resource, the user may unlock access to the computerized resource again. In some arrangements, the form of authentication is the same regardless of whether the user is initially unlocking access or unlocking access again. In other arrangements, initial authentication is based on different sets of authentication factors which provide different security strengths. Moreover, such authentication may be performed locally (e.g., by the mobile device itself), remotely (e.g., by communicating with an external authentication server), combinations thereof, and so on.

It should be understood that a variety of mechanisms are available to the user to determine whether the mobile device is in a vehicle that is moving. Examples include using a global positioning system (GPS) circuit within the mobile device to identify changing geolocation, using accelerometer circuitry within the mobile device to identify changing vehicle speed, using electronic circuitry of the vehicle to determine whether the user is driving, combinations thereof, and so on.

It should be understood that, when the timer is started, the timer normally counts from an initial value to a predetermined timeout value to impose a normal timeout period (e.g., five minutes, 10 minutes, etc.). However, if the vehicle is moving, the timer is reset from a current value (i.e., somewhere between the initial value and the predetermined timeout value) back to the initial value. In some arrangements, the timer counts from zero up to a predefined amount (i.e., increments). In other arrangements, the timer counts from a predefined amount down to zero (i.e., decrements). Other timer counting mechanisms are suitable for use as well.

In some arrangements, the mobile device detects whether the mobile device has exited the vehicle and, if so, locks access to the computerized resource. Such detection may be implemented in a variety of ways such as by scanning for presence of a wireless network (e.g., Bluetooth, wireless Ethernet, etc.), detection of connection to a cable, infrared or RF scanning, etc.

In some arrangements, the mobile device transitions between a standard mode and a driving mode. Restarting the timer in response to the sensor signal is enabled when the mobile device is in the driving mode. However, restarting the timer in response to the sensor signal is disabled when the mobile device is in the standard mode.

Another embodiment is directed to a user interface, memory, and control circuitry coupled to the user interface and the memory. The memory stores instructions which, when carried out by the control circuitry, cause the control circuitry to:
  (A) in response to successfully authenticating a user via the user interface, unlock access to the computerized resource of the mobile device and start a timer which is configured to lock access to the computerized resource of the mobile device upon timer expiration,
  (B) after the timer is started and while access to the computerized resource of the mobile device is unlocked, receive a sensor signal from sensor circuitry, the sensor signal indicating whether the mobile device is in a vehicle that is currently moving, and
  (C) in response to the sensor signal indicating that the mobile device is in a vehicle that is currently moving, restart the timer which is configured to lock access to the computerized resource of the mobile device upon timer expiration.

Suitable computerized resources include a user interface or screen of the mobile device, mobile device applications or apps, a camera of the mobile device, phone circuitry of the mobile device, network access, login access, front-end access to resources on remote computer servers, combinations thereof, and so on.

Yet another embodiment is directed to a computer program product having a non-transitory computer readable medium which stores a set of instructions to control access to a computerized resource of a mobile device. The set of instructions, when carried out by the mobile device, causing the mobile device to perform a method of:
  (A) in response to successfully authenticating a user, unlocking access to the computerized resource of the mobile device and starting a timer which is configured to lock access to the computerized resource of the mobile device upon timer expiration;
  (B) after the timer is started and while access to the computerized resource of the mobile device is unlocked, receiving a sensor signal from sensor circuitry, the sensor signal indicating whether the mobile device is in a vehicle that is currently moving; and
  (C) in response to the sensor signal indicating that the mobile device is in a vehicle that is currently moving, restarting the timer which is configured to lock access to the computerized resource of the mobile device upon timer expiration.

It should be understood that, in the cloud context, certain electronic circuitry (e.g., a resource server, an authentication server, etc.) is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in controlling access to a computerized resource of a mobile device.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to restarting a locking timer of a mobile device (i.e., a timer which locks access to a computerized resource such as a user screen after a period of inactivity) while the authorized user of the mobile device is in a vehicle that is currently moving. Such an improved technique enables the user to enter the correct password before driving the vehicle and then enjoy continued access while driving. That is, such restarting of the locking timer while the user is driving prevents the timer from timing out and re-locking user access. Accordingly, the user does not need to re-enter the password while driving. As a result, the mobile device does not promote accident-causing behavior (e.g., distracted driving). Furthermore, the user is able to choose longer, more random passwords for the mobile device such as "3781790417" which provide stronger security.

Figure 1:
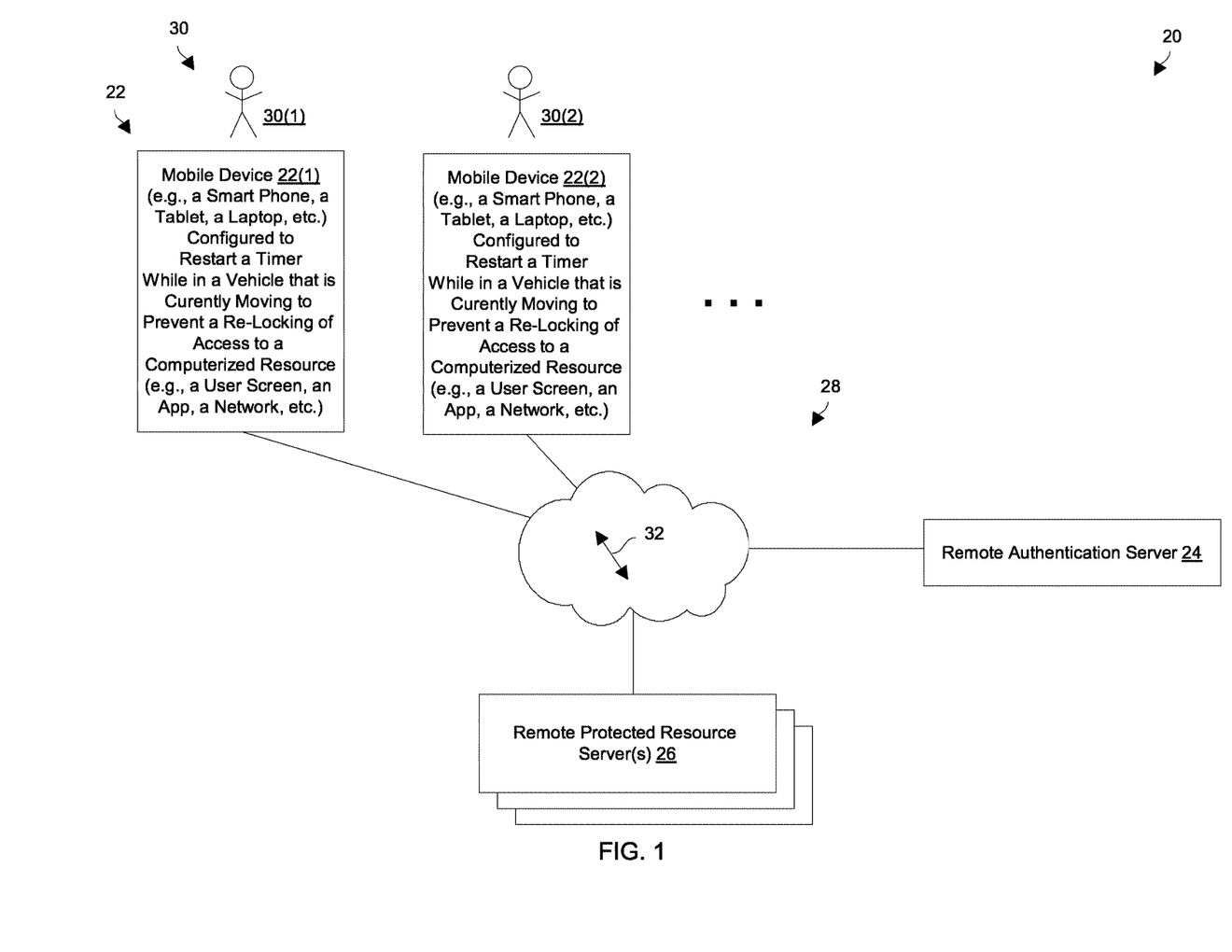
FIG. 1 is a block diagram of an electronic environment which supports controlling access to computerized resources of mobile devices.

FIG. 1 shows an electronic environment 20 which is suitable for controlling access to computerized resources of mobile devices. The electronic environment 20 includes mobile devices 22(1), 22(2), . . . (collectively, mobile devices 22), a remote authentication server 24, a set of remote protected resource servers 26, and a communications medium 28.

Each mobile device 22 is constructed and arranged to control access to a set of computerized resources on behalf of a respective user 30 so that the user 30 is able to perform useful work. Along these lines, the mobile device 22(1) controls access for a user 30(1), the mobile device 22(2) controls access for a user 30(2), and so on. It should be understood that user authentication to unlock access to the set of computerized resources may performed completely locally (i.e., entirely within a mobile device 22), or involve the remote authentication server 24 (i.e., where at least a portion of the authentication process involves the remote authentication server 24). A suitable form factor for a mobile device 22 is a smart phone, a tablet, a laptop computer, etc. which is equipped with a touch screen or similar interface for user input/output (I/O).

The remote authentication server 24 is constructed and arranged to remotely authenticate users of the mobile devices 22 as needed. The remote authentication server 24 may communicate directly with mobile devices 22, or indirectly with the mobile devices 22 (e.g., when a remote protected resource server 26 requires authentication of a user requesting or attempting access via a mobile device 22).

The set of remote protected resource servers 26 represent external electronic equipment which may communicate with the mobile devices 22 and/or the remote authentication server 24. Each remote protected resource server 26 is capable of providing, to a user 30, access to one or more computerized resources.

The communications medium 28 is constructed and arranged to connect the various components of the electronic environment 20 together to enable these components to exchange electronic signals 32 (e.g., see the double arrow 32). At least a portion of the communications medium 28 is illustrated as a cloud to indicate that the communications medium 28 is capable of having a variety of different topologies including backbone, hub-and-spoke, loop, irregular, combinations thereof, and so on. Along these lines, the communications medium 28 may include copper-based data communications devices and cabling, fiber optic devices and cabling, wireless devices, combinations thereof, etc. Furthermore, the communications medium 28 is capable of supporting LAN-based communications, SAN-based communications, cellular communications, combinations thereof, etc.

During operation, the users 30 of the mobile devices 22 authenticate in order to access computerized resources using their mobile devices 22. In particular, a user 30 provides a set of authentication factors which is evaluated to determine whether that user 30 is authentic or a fraudster. By way of example, the set of authentication factors includes a password which is entered via a user screen. Other authentication factors may be used in addition to a password or in place of the password such as biometrics, cookies, one-time passcodes (OTPs), personal identification numbers (PINs), and so on. Moreover, other forms of authentication may be included or substituted such as knowledge based authentication (KBA), risk-based or adaptive authentication to authenticate based on measures of risk, multi-factor authentication, combinations thereof, and so on.

Additionally, the computerized resources may reside locally on the mobile devices 22 themselves (e.g., access to locally installed apps, data, network environments, etc.). Also, such computerized resources may reside remotely on one or more remote protected resource servers 26 (e.g., access to remote apps, remote data, remote environments, etc.). Suitable computerized resources include user screen access, phone access, camera access, wireless network access, content (e.g., documents, files, email, database entries, movies, music, other types of visual and/or audio media, general information, games, etc.), services (e.g., banking transactions, securities trading, online ordering and purchasing, etc.), VPN access, application access, permissions and/or privileges, encryption, other accessible computerized resources, combinations thereof, and so on.

It should be understood that each mobile device 22 is equipped with timer circuitry that is started once a user 30 successfully authenticates (e.g., by correctly entering a password) to unlock access to a computerized resource. Once the timer circuitry of a mobile device 22 is started, the timer circuitry counts from an initial value to a predetermined timeout value to impose a normal timeout period (e.g., five minutes, 10 minutes, etc.). While the timer circuitry continues to count toward the predetermined timeout value, the mobile device 22 allows the user 30 to access the computerized resource. Furthermore, when the user 30 accesses the computerized resource, the timer circuitry resets to the initial value.

For example, suppose that the computerized resource is a user screen of a mobile device 22. After the user 30 successfully authenticates, the user 30 is able to access various mobile device features via the user screen and the timer circuitry of the mobile device 22 starts counting toward the predetermined timeout value. Each time the user screen detects user activity (e.g., in response to the user 30 entering a user gesture), the timer circuitry responds by resetting to the initial value.

However, if the timer circuitry of the mobile device 22 reaches the predetermined timeout value due to user inactivity, the mobile device 22 re-locks access to the computerized resource. At this point, the user 30 must correctly re-enter the password to regain access to the computerized resource.

It should be further understood that each mobile device 22 operates selectively in either a normal mode or a driving mode. When a mobile device 22 is not in a vehicle that is moving, that mobile device 22 operates in the normal mode and the timer circuitry behaves as described above. Accordingly, the user 30 re-enters the password when the timer circuitry reaches the predetermined timeout value.

However, when a mobile device 22 is in a vehicle that is moving, that mobile device 22 operates in the driving mode and the timer circuitry resets in response to detected vehicle movement, i.e., the timer circuitry resets in a manner similar to that described above when the user 30 provides activity to a user screen. Accordingly, access to the computerized resource does not re-lock while the user 30 is driving.

It should be understood that, in some arrangements, the timer circuitry counts up from zero to a predefined amount (i.e., the timer circuitry increments a counter). In other arrangements, the timer circuitry counts down from a predefined amount to zero (i.e., the timer circuitry decrements a counter). Other timer counting mechanisms are suitable for use as well. Further details will now be provided with reference to FIG. 2.

Figure 2:
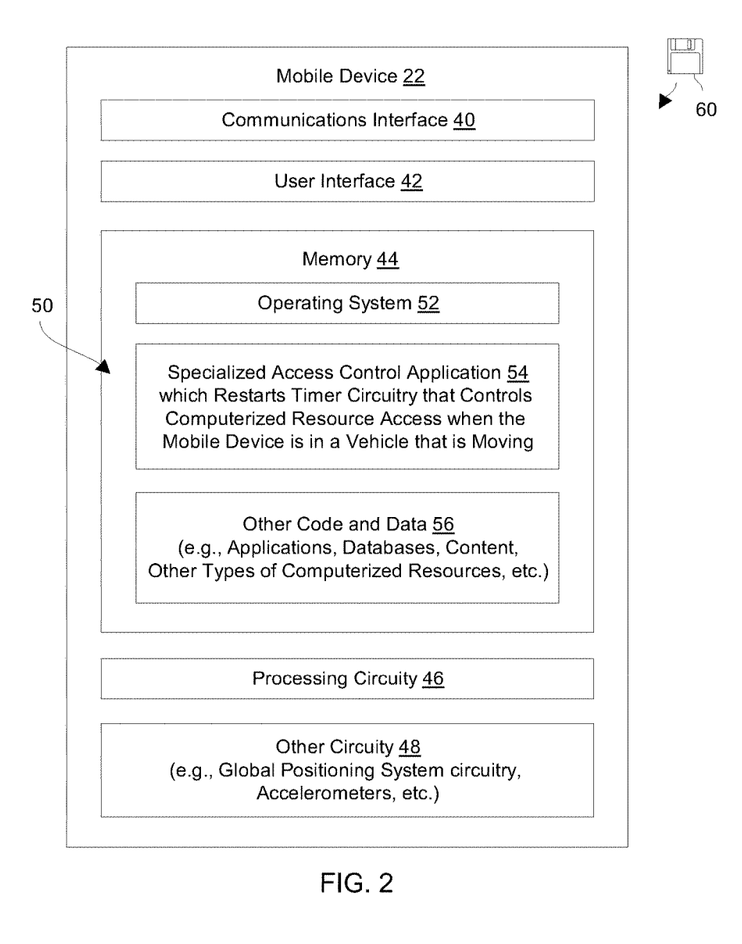
FIG. 2 is a block diagram of a mobile device of FIG. 1.

FIG. 2 shows particular details of a mobile device 22 of the electronic environment 20. The mobile device 22 (e.g., a smart phone, a tablet, etc.) includes a communications interface 40, a user interface 42, memory 44, processing circuitry 46, and other circuitry 48.

The communications interface 40 is constructed and arranged to connect the mobile device 22 to the communications medium 28 (also see FIG. 1). Accordingly, the communications interface 40 enables the mobile device 22 to communicate with the other components of the electronic environment 20. Such communications may be cable-based or wireless (i.e., IP-based, SAN-based, cellular, Bluetooth, combinations thereof, and so on).

The user interface 42 is constructed and arranged to receive input from a user 30 and provide output to the user 30. In some arrangements, the user interface 74 is formed by one or more specialized components such as a touch screen, a miniature keyboard, a microphone, a speaker, a camera, and so on.

The memory 44 is intended to represent both volatile storage (e.g., DRAM, SRAM, etc.) and non-volatile storage (e.g., flash memory, magnetic disk drives, etc.). The memory 44 stores a variety of software constructs 50 including an operating system 52, a specialized access control application 54, and other code/data 56.

The processing circuitry 46 is constructed and arranged to operate in accordance with the various software constructs 50 stored in the memory 44. In particular, the processing circuitry 46, when executing the operating system 52, manages various parts of the mobile device 22 (e.g., memory allocation, processor cycles, etc.). Additionally, the processing circuitry 46, when executing the specialized access control application 54, forms specialized circuitry which control computerized resource access (e.g., the specialized circuitry restarts a timer when the mobile device 22 is in a vehicle that is moving to prevent re-locking of a computerized resource). Furthermore, the other code and data 56 represents other types of information such as other applications (or apps), databases, content, utilities, parameters, combinations thereof, and other types of computerized resources, etc.

It should be understood that the above-mentioned specialized circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 60 is capable of delivering all or portions of the software to the mobile device 22. The computer program product 60 has a non-transitory and non-volatile computer readable medium which stores a set of instructions to control one or more operations of the mobile device 22. Examples of suitable computer readable storage media include tangible articles of manufacture and apparatus which store instructions in a non-volatile manner such as CD-ROM, flash memory, disk memory, tape memory, and the like.

The other circuitry 48 represents additional specialized componentry of the mobile device 22. Examples of such componentry include global positioning system (GPS) circuitry, accelerometers, and other circuitry which is typical of a portable apparatus. Further details will now be provided with reference to FIG. 3.

Figure 3:
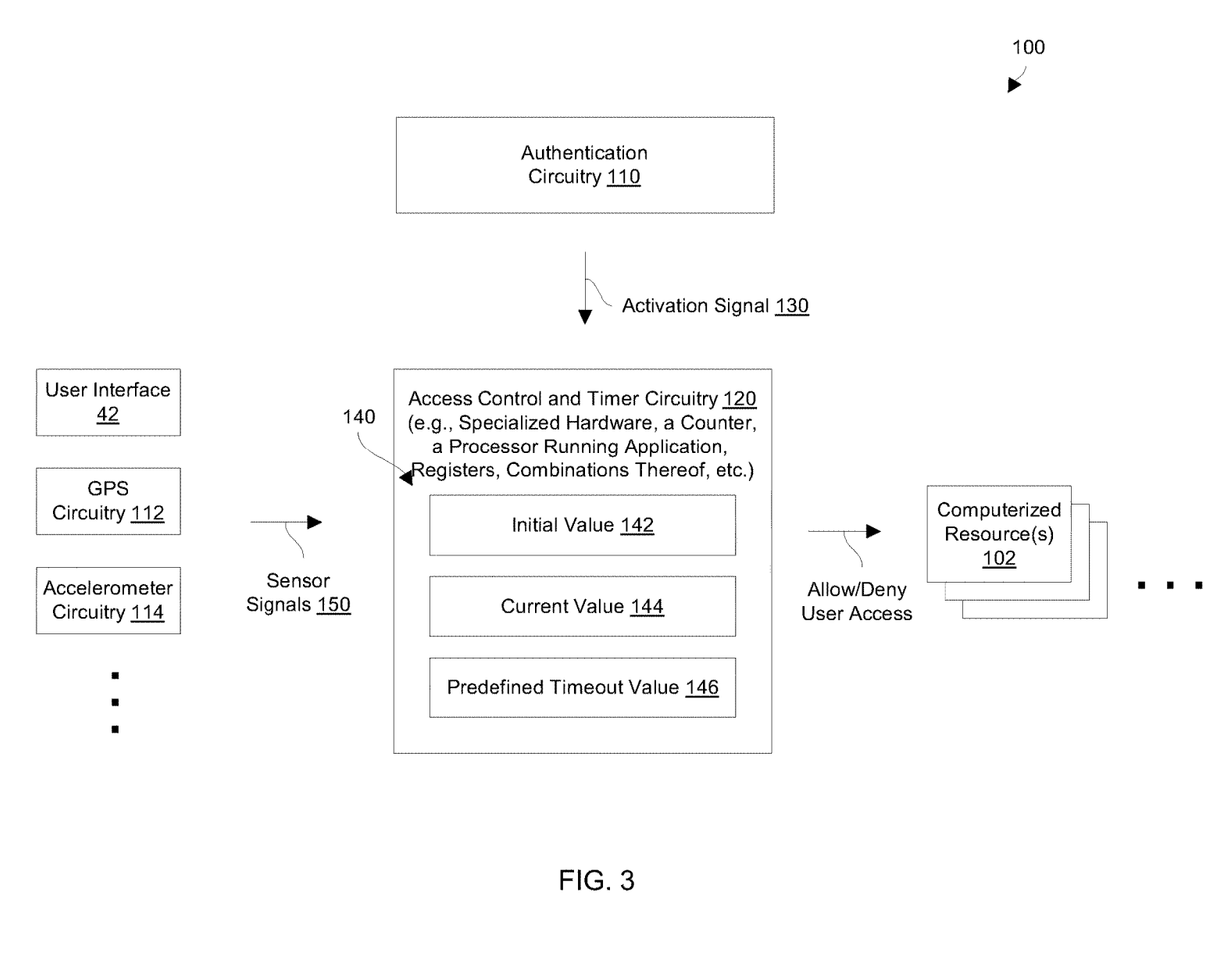
FIG. 3 is a block diagram of particular components of the mobile device of FIG. 2 which are involved in controlling access to a computerized resource.

FIG. 3 is a block diagram of particular components 100 of the mobile device 22 (FIG. 2) that are involved in controlling access to a computerized resource 102 such as a user screen, an application, a service, a smart phone feature, etc. The particular components 100 include authentication circuitry 110, the user interface 42, GPS circuitry 112, accelerometer circuitry 114, and access control and timer circuitry 120, among other things. The access control and timer circuitry 120 may be formed by specialized hardware, a counter, a processor running an application, registers, memory, combinations thereof, and so on.

During operation, the authentication circuitry 110 performs an authentication operation to determine whether the user 30 is legitimate or a fraudster. Such operation may performed entirely locally (e.g., exclusively within the mobile device 22) or involve communication with the remote authentication server 26 (also see FIG. 1). Along these lines, authentication may involve comparing a current set of authentication factors and/or user behavior obtained from the user 30 to an expected set of authentication factors and/or a user profile. If the authentication circuitry 110 considers the user 30 to be authentic, the authentication circuitry 110 provides an activation signal 130 to the access control and timer circuitry 120 to activate (or enable) the access control and timer circuitry 120.

In response to the activation signal 130 from the authentication circuitry 110, the access control and timer circuitry 120 (i) unlocks a set of computerized resources 102 that required successful authentication prior to access, and (ii) starts a timer which utilizes a set of timer values 140 that includes an initial value 142, a current value 144, and a predefined timeout value 146. The timer is configured to lock access to the set of computerized resources 102 upon timer expiration. However, while the set of computerized resources 102 remains unlocked, the access control and timer circuitry 120 permits the user 30 to access the set of computerized resources 102.

To start the timer, the access control and timer circuitry 120 first sets the current value 144 equal to the initial value 142 (e.g., zero). The access control and timer circuitry 120 then counts the current value 144 toward the predefined timeout value 146. If the current value 144 reaches the predefined timeout value 146 (i.e., if the timer expires), the access control and timer circuitry 120 re-locks the set of computerized resources 102. While the set of computerized resources 102 is locked, the access control and timer circuitry 120 prohibits the user 30 from accessing the set of computerized resources 102.

During such operation, the access control and timer circuitry 120 may reset the current value 144 to the initial value from time to time in response to a variety of sensor signals 150. As a result, access to the set of computerized resources 102 is extended, i.e., the user 30 is able to continue to access the set of computerized resources 102 without needing to re-authenticate. To this end, the access control and timer circuitry 120 communicates with several sources of sensed information.

Along these lines, a sensor signal 150 from the user interface 42 indicates whether the user 30 is accessing the set of computerized resources 102. In particular, the user 30 may be entering user gestures into a user screen of a smart phone which thus remains unlocked.

Similarly, the access control and timer circuitry 120 receives other sensor signals 150 indicating whether the mobile device 22 is in a vehicle that is moving. These sensor signals 150 inform the access control and timer circuitry 120 whether the mobile device 22 should operate in a normal mode as described above, or in a driving mode in which the access control and timer circuitry 120 holds the set of computerized resources in an unlocked state thus alleviating the need for the user 30 to re-authenticate while driving.

In particular, when the access control and timer circuitry 120 receives a sensor signal 150 indicating that the mobile device 22 is in a vehicle that is moving, the access control and timer circuitry 120 resets the current value 144 to the initial value 142. For example, the GPS circuitry 112 may provide a sensor signal 150 to the access control and timer circuitry 120 in response to a detected change in geolocation. The access control and timer circuitry 120 responds by resetting the current value 144 to the initial value 142 thus enabling the user 30 to continue access without re-authenticating.

As another example, the accelerometer circuitry 114 may provide a sensor signal 150 to the access control and timer circuitry 120 in response to a detected change in vehicle speed. Again, the access control and timer circuitry 120 responds by resetting the current value 144 to the initial value 142 thus enabling the user 30 to continue access without re-authenticating.

Other situations are suitable for use as well. Along these lines, the mobile device 22 may be able to communicate directly with vehicle circuitry (e.g., via Bluetooth, via a cable, etc.) to receive a sensor signal 150 from the vehicle circuitry. In some situations, the access control and timer circuitry 120 is able to distinguish whether the vehicle's transmission is in park, or the user 30 is stepping on the brake in stop-and-go traffic. Moreover, the mobile device 22 may even connect to external servers for more information (e.g., WAZE).

In some arrangements, the mobile device 22 is able to determine whether the mobile device 22 currently resides within a vehicle. If so, the mobile device 22 switches from a normal mode to a driving mode which enables the timer to be reset in response to detecting movement of the vehicle. When the mobile device 22 detects that it is no longer in the vehicle (or if the vehicle is turned off), the mobile device switches from driving mode back to normal mode. Such a feature is useful in enabling the mobile device 22 to distinguish between the user driving, the user walking, etc. Further details will now be provided with reference to FIG. 4.

Figure 4:
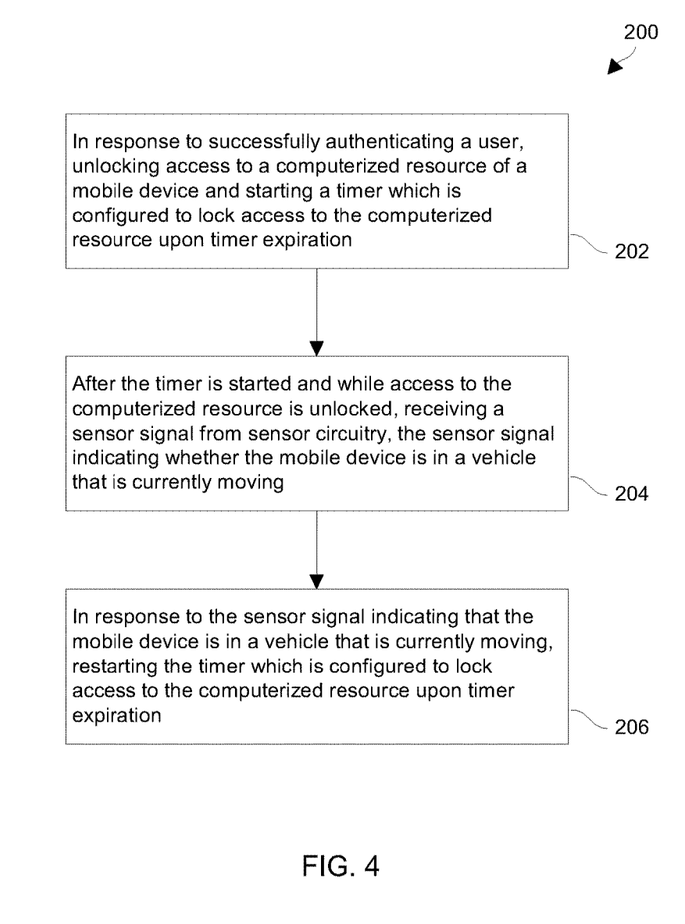
FIG. 4 is a flowchart of a procedure which is performed by the mobile device of FIG. 2.

FIG. 4 is a flowchart of a procedure 200 which is performed by circuitry of a mobile device 22 to control access to a computerized resource. At 202, the mobile device circuitry, in response to successfully authenticating a user, unlocks access to a computerized resource of the mobile device and starts a timer which is configured to lock access to the computerized resource of the mobile device upon timer expiration (also see FIG. 3).

At 204, the mobile device circuitry, after the timer is started and while access to the computerized resource of the mobile device is unlocked, receives a sensor signal from sensor circuitry. The sensor signal indicates whether the mobile device is in a vehicle that is currently moving.

At 206, the mobile device circuitry, in response to the sensor signal indicating that the mobile device is in a vehicle that is currently moving, restarting the timer which is configured to lock access to the computerized resource of the mobile device upon timer expiration. Accordingly, there user does not need to re-authenticate to the mobile device 22 while driving.

It should be understood that, while the mobile device circuitry continues to receive the sensor signal, the mobile device circuitry may determine that the mobile device is in a vehicle that is not currently moving (e.g., if there is no indicated change in geolocation or vehicle speed, if the user removes the mobile device from the vehicle, etc.). In this situation, the, the mobile device circuitry may allow the timer to continue counting toward timer expiration. Ultimately, if the timer expires by counting to a predefined timeout threshold, the mobile device circuitry re-locks access to the computerized resource. However, since the mobile device is no longer in a vehicle that is moving, there is no risk of the user being involved in a vehicle accident. Rather, the user is able to re-authenticate (e.g., by safely entering a long random password which provides strong security).

As described above, improved techniques are directed to restarting locking timers of mobile devices (i.e., timers which lock computerized resources such as user screens after periods of inactivity) while the authorized users of the mobile devices are driving vehicles. Such improved techniques enable the users to enter the correct passwords prior to driving and then enjoy continued access while the users are driving. That is, such restarting of the locking timers while the users are driving prevents re-locking of user access thus alleviating the need for the users to re-enter passwords while driving. Accordingly, the mobile devices do not promote accident-causing behavior (e.g., distracted driving). Moreover, the users are able to choose longer, more random passwords for the mobile devices such as "3781790417" which provide stronger security.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, one should appreciate that some humans and companies may require entrance of a secure passcode (e.g., a password, a PIN, etc.) on a lock screen of a smart phone. Only then can the human access the phone. However, this is difficult as well as unsafe to do while driving. Some of humans conventionally address this by using trivial passwords (e.g., "1111") which then compromises the security of the phone. Furthermore, the screen locks after N minutes (e.g. two minutes) of non-use, which can then require the human to reenter the passcode, thereby repeating unsafe and potentially accident-causing behavior.

With the improved techniques disclosed herein, a user 30 can now enter a vehicle and, before the user starts driving, authenticate with a mobile device 22 (e.g., enter a passcode perhaps with other authentication factors such as a biometric) to unlock access to a computerized resource 102 such as unlocking the user screen.

Next, as long as the vehicle is moving, the computerized resource of the mobile device 22 remains unlocked. In particular, the timer that counts to a predefined time limit before re-locking the computerized resource 102 resets when vehicle motion starts. Accordingly, if the vehicle stops for a short period of time but starts moving again before the timer expires, the mobile device 22 continues to keep the computerized resource 102 unlocked for the user 30. In some arrangements, the timer remains reset as long as the vehicle remains in motion. In other arrangements, the mobile device 22 periodically detects whether the vehicle is in motion and resets upon each detection of vehicle motion. GPS circuitry, accelerometers and/or other technologies can be used to detect the vehicle's motion.

However, the mobile device 22 is constructed and arranged to re-lock the computerized resource 102 if the timer is allowed to count to a predefined amount (e.g., two minutes of no vehicle motion, five minutes of no vehicle motion, etc.). If the timer reaches this threshold, the mobile device 22 re-locks the computerized resource 102. That is, if the user 30 stops for an extended amount of time and the timer expires, the mobile device 22 prompts the user 30 (e.g., by providing a screen and/or audio notifications), so that the user 30 can re-authenticate before the user 30 continues driving. Notice that since the user 30 was stopped for an extended amount of time, it is safe for the user 30 to re-authenticate.

In some arrangements, wireless technology (e.g., RF, Bluetooth, wireless Ethernet, etc.) enables the mobile device 22 to detect that the mobile device 22 is in the user's vehicle. In such arrangements, the mobile device may be configured to automatically prompt the user 30 to authenticate upon such detection. Accordingly, the user 30 is prompted to authenticate and use the mobile device 22 before the user 30 drives.

In some arrangements, the operation of the mobile device 22 is extended to detect certain types of vehicle behavior via technologies such as GPS, WAZE, etc. Such technologies enable the mobile device 22 to determine whether the vehicle is in stop-and-go traffic, parked, on a local street or on private property, and so on. In some situations, the mobile device 22 links with the vehicles circuitry (e.g., via Bluetooth) and leverages off of the particular vehicle data (e.g., a geolocation from the vehicles GPS, whether the vehicle is in parked mode, whether the engine has been turned off, etc.). Other input data is suitable for use as well such as time of day, weather, temperature, whether the wipers are on, and so on.

It should be understood that users 30 are thus able to make use of their mobile devices 22 (e.g., via voice commands, simple touch, etc.) without needing to enter their PINs/passwords/etc. while driving. That is, users 30 are now able to avoid accident-causing behavior that would otherwise exist due to users 30 having to place a higher level of attention entering a PIN or PW.

Moreover, since users 30 will not be required to enter their passcodes while driving, the users 30 will be able to choose longer, more "random" passwords such as "3781790417" or even other forms of authentication which provide stronger security. Such modifications and enhancements are intended to belong to various embodiments of the disclosure.

What is claimed is:

1. A method of controlling access to a computerized resource of a mobile device, the method comprising:
   in response to successfully authenticating a user, unlocking access to the computerized resource of the mobile device and starting a timer which is configured to lock the access to the computerized resource of the mobile device upon timer expiration;
   after the timer is started and while the access to the computerized resource of the mobile device is unlocked, receiving a sensor signal from sensor circuitry, the sensor signal indicating whether a vehicle in which the mobile device is physically located is currently moving; and
   in response to the sensor signal indicating that the vehicle in which the mobile device is physically located is currently moving, restarting the timer which is configured to lock the access to the computerized resource of the mobile device upon timer expiration.

2. The method as in claim 1, further comprising:
   continuing to receive the sensor signal from the sensor circuitry; and
   in response to the sensor signal indicating that the vehicle in which the mobile device is physically located is not currently moving and while continuing to receive the sensor signal, enabling the timer to count toward timer expiration.

3. The method as in claim 2, further comprising:
   prior to starting the timer and while the access to the computerized resource of the mobile device is locked, prompting the user to provide a set of authentication factors and performing an authentication operation which successfully authenticates the user based on the set of authentication factors.

4. The method as in claim 3, further comprising:
   in response to timer expiration, re-locking the access to the computerized resource of the mobile device; and
   after the access to the computerized resource of the mobile device is re-locked, prompting the user to provide another set of authentication factors and performing another authentication operation which successfully authenticates the user based on the other set of authentication factors.

5. The method as in claim 4 wherein the set of authentication factors and the other set of authentication factors are the same to provide consistent security strength.

6. The method as in claim 4 wherein the set of authentication factors provides stronger security than the other set of authentication factors.

7. The method as in claim 3 wherein the sensor circuitry resides within the mobile device; and wherein receiving the sensor signal from the sensor circuitry includes:
   obtaining the sensor signal from the sensor circuitry while the vehicle in which the mobile device is physical located is operated by the user.

8. The method as in claim 7 wherein the sensor circuitry includes a global positioning system (GPS) circuit residing within the mobile device; wherein the timer is constructed and arranged to lock the access to the computerized resource of the mobile device upon counting from an initial value to a predetermined timeout value; and wherein restarting the timer includes:
   resetting the timer from a current value, which is between the initial value and the predetermined timeout value, back to the initial value in response to a geolocation change indicated by the GPS circuit.

9. The method as in claim 7 wherein the sensor circuitry includes accelerometer circuitry residing within the mobile device; wherein the timer is constructed and arranged to lock the access to the computerized resource upon counting from an initial value to a predetermined timeout value; and wherein restarting the timer includes:
   resetting the timer from a current value, which is between the initial value and the predetermined timeout value, back to the initial value in response to changing vehicle speed indicated by the accelerometer circuitry.

10. The method as in claim 3 wherein receiving the sensor signal from the sensor circuitry includes:
    obtaining the sensor signal from the sensor circuitry while the vehicle in which the mobile device is physically located is operated by the user;
    wherein the sensor circuitry includes vehicle circuitry residing within the vehicle;
    wherein the timer is constructed and arranged to lock the access to the computerized resource of the mobile device upon counting from an initial value to a predetermined timeout value; and
    wherein restarting the timer includes:
    resetting the timer from a current value, which is between the initial value and the predetermined timeout value, back to the initial value in response to vehicle movement indicated by the vehicle circuitry.

11. The method as in claim 3, further comprising:
after the timer is restarted in response to the sensor signal indicating that the vehicle in which the mobile device is physically located is currently moving, detecting that the mobile device is no longer physically located in the vehicle; and
locking the access to the computerized resource of the mobile device in response to detecting that the mobile device is no longer physically located in the vehicle.

12. The method as in claim 3, further comprising:
detecting that the mobile device has entered the vehicle and, in response to detecting that the mobile device has entered the vehicle, transitioning the mobile device from a standard mode to a driving mode, and
detecting that the mobile device has exited the vehicle and, in response to detecting that the mobile device has exited the vehicle, transitioning the mobile device from the driving mode to the standard mode;
wherein restarting the timer in response to the sensor signal is enabled when the mobile device is in the driving mode; and
wherein restarting the timer in response to the sensor signal is disabled when the mobile device is in the standard mode.

13. The method as in claim 12, wherein the vehicle comprises a designated vehicle.

14. The method of claim 1, wherein restarting the timer includes resetting the timer from a current value, which is between an initial value and a predetermined timeout value, back to the initial value in response to the sensor signal indicating that the vehicle in which the mobile device is physically located is currently moving, whereby the access to the computerized resource of the mobile device is extended while the vehicle remains moving.

15. The method of claim 14, further comprising:
wherein the sensor circuitry periodically detects whether the vehicle in which the mobile device is physically located is currently moving after the timer is started and while the access to the computerized resource of the mobile device is unlocked; and
wherein the restarting of the timer includes resetting the timer back to the initial value each time the sensor circuitry detects that the vehicle in which the mobile device is physically located is moving.

16. A mobile device, comprising:
a user interface;
memory; and
control circuitry coupled to the user interface and the memory, the memory storing instructions which, when carried out by the control circuitry, cause the control circuitry to:
in response to successfully authenticating a user via the user interface, unlock the access to the computerized resource of the mobile device and start a timer which is configured to lock the access to the computerized resource of the mobile device upon timer expiration,
after the timer is started and while the access to the computerized resource of the mobile device is unlocked, receive a sensor signal from sensor circuitry, the sensor signal indicating whether a vehicle in which the mobile device is physically located is currently moving, and
in response to the sensor signal indicating that the vehicle in which the mobile device is physically located is currently moving, restart the timer which is configured to lock the access to the computerized resource of the mobile device upon timer expiration.

17. The mobile device as in claim 16 wherein the instructions further cause the control circuitry to:
continue to receive the sensor signal from the sensor circuitry, and
in response to the sensor signal indicating that the vehicle in which the mobile device is physically located is not currently moving and while continuing to receive the sensor signal, enable the timer to count toward timer expiration.

18. The mobile device as in claim 17 wherein the instructions further cause the control circuitry to:
prior to starting the timer and while the access to the computerized resource of the mobile device is locked, prompt the user to provide a set of authentication factors and perform an authentication operation which successfully authenticates the user based on the set of authentication factors.

19. The mobile device as in claim 18 wherein the instructions further cause the control circuitry to:
in response to timer expiration, re-lock the access to the computerized resource of the mobile device; and
after the access to the computerized resource of the mobile device is re-locked, prompt the user to provide another set of authentication factors and perform another authentication operation which successfully authenticates the user based on the other set of authentication factors.

20. The mobile device as in claim 19 wherein the instructions further cause the control circuitry to:
detect that the mobile device has entered the vehicle and, in response to detecting that the mobile device has entered the vehicle, transitioning the mobile device from a standard mode to a driving mode, and
detect that the mobile device has exited the vehicle and, in response to detecting that the mobile device has exited the vehicle, transitioning the mobile device from the driving mode to the standard mode;
wherein restarting the timer in response to the sensor signal is enabled when the mobile device is in the driving mode; and
wherein restarting the timer in response to the sensor signal is disabled when the mobile device is in the standard mode.

21. The mobile device as in claim 20 wherein the instructions further cause the control circuitry to:
after the timer is restarted in response to the sensor signal indicating that the vehicle in which the mobile device is physically located is currently moving, detect that the mobile device is no longer physically located in the vehicle; and
lock the access to the computerized resource in response to detecting that the mobile device is no longer physically located in the vehicle.

22. The mobile device as in claim 21 wherein the control circuitry, when receiving the sensor signal, is constructed and arranged to:
obtain the sensor signal from the sensor circuitry while the vehicle in which the mobile device is physically located is operated by the user;
wherein the sensor circuitry includes vehicle circuitry residing within the vehicle;
wherein the timer is constructed and arranged to lock the access to the computerized resource of the mobile device upon counting from an initial value to a predetermined timeout value; and wherein restarting the timer includes:
    resetting the timer from a current value, which is between the initial value and the predetermined timeout value, back to the initial value in response to vehicle movement indicated by the vehicle circuitry.

23. The mobile device as in claim 20, wherein the vehicle comprises a designated vehicle.

24. A computer program product having a non-transitory computer readable medium which stores a set of instructions to control access to a computerized resource of a mobile device; the set of instructions, when carried out by the mobile device, causing the mobile device to perform a method of:
    in response to successfully authenticating a user, unlocking access to the computerized resource of the mobile device and starting a timer which is configured to lock the access to the computerized resource of the mobile device upon timer expiration;
    after the timer is started and while the access to the computerized resource of the mobile device is unlocked, receiving a sensor signal from sensor circuitry, the sensor signal indicating whether a vehicle in which the mobile device is physically located is currently moving; and
    in response to the sensor signal indicating that the vehicle in which the mobile device is physically located is currently moving, restarting the timer which is configured to lock the access to the computerized resource of the mobile device upon timer expiration.

\* \* \* \* \*